United States Patent
Yoshida

(10) Patent No.: US 6,175,666 B1
(45) Date of Patent: *Jan. 16, 2001

(54) IMAGE SCANNING APPARATUS

(75) Inventor: Futoshi Yoshida, Ashigarakami-gun (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/993,490

(22) Filed: Dec. 18, 1997

(30) Foreign Application Priority Data

Dec. 19, 1996 (JP) .................................................. 8-340200

(51) Int. Cl.[7] .................................................. G06K 7/00
(52) U.S. Cl. .................................................. 382/312; 358/474
(58) Field of Search .................................................. 382/312; 358/474, 358/471, 472, 500, 501, 410, 411, 420, 421, 422, 423

(56) References Cited

U.S. PATENT DOCUMENTS

| | | | | |
|---|---|---|---|---|
| 3,652,793 | * | 3/1972 | Farr | 358/498 |
| 4,109,843 | * | 8/1978 | Usui | 226/109 |
| 4,280,145 | * | 7/1981 | Norrell | 358/289 |
| 4,882,631 | * | 11/1989 | Mine et al. | 358/471 |
| 5,267,056 | * | 11/1993 | Stemmle | 358/472 |
| 5,285,294 | * | 2/1994 | Takeuchi | 358/474 |
| 5,315,322 | * | 5/1994 | Bannai | 346/108 |
| 5,529,414 | * | 6/1996 | Katano | 400/636.2 |
| 6,091,514 | * | 7/2000 | Hasegawa | 358/296 |

* cited by examiner

Primary Examiner—Jerome Grant, II
(74) Attorney, Agent, or Firm—Sughrue, Mion, Zinn, Macpeak & Seas, PLLC

(57) ABSTRACT

There is provided an image scanning apparatus which can restrict unevenness in rotation of a transmission, and can substantially make constant a sub-scanning interval so as to prevent lowering of an image quality. In the case where a movement rate of sub-scanning is set with use of a stepping motor 16, an integer rotation of a first gear 12 is controlled so as to be set as one step of sub-scanning movement. Further, in the case where a transmission means is composed of a plurality of gears (first gear 12, second gear 14), the plurality of gears have the number of teeth which is set so that when one (the second gear 14) of gears meshing with each other makes one rotation, the other (the first gear 12) thereof makes an integer rotation.

20 Claims, 11 Drawing Sheets

IMAGE SCANNING APPARATUS

BACKGROUND OF THE INVENTION

1. Field of the Invention

The present invention relates to an image scanning apparatus which can effect a sub-scanning operation by relatively and intermittently moving a main scanning unit and a recording medium stepwise, and can record or read an image by driving the main scanning unit each time the sub-scanning is stopped.

2. Description of the Prior Art

A number of image recording apparatuses for recording an image in an image scanning apparatus have been developed nowadays, which are each mounted with a digital exposure system. Generally, in the digital exposure system, an image is recorded on a recording medium in such a manner that a light beam outputted from a semiconductor laser is modulated with image data and the light beam is deflected by high-speed rotation of a polygon mirror (main scanning), and further the light beam reflected by the polygon mirror is subjected to sub-scanning with use of a galvano-mirror or the like, or the above main scanning is effected repeatedly while moving the recording medium (or moving the recording medium stepwise). In this case, as the recording medium, a photosensitive drum electrified by a corona discharge, a photosensitive material or the like may be used. Also, in place of the semiconductor laser, other light emitter such as an LED may be used as a light source.

In case of repeating the above main scanning while shifting the recording medium in a stepwise manner, it is general that a stepping motor is used for activating its stepwise movement. The stepping motor is suitable for performing a highly precise positioning because a stop position of the recording medium can be controlled according to pulse control.

A transmission system is usually interposed between a rotary shaft of the stepping motor and a conveying roller for carrying the recording medium, and a rotational speed of the stepping motor is transmitted to the conveying roller so as to be decelerated.

SUMMARY OF THE INVENTION

However, the aforesaid transmission system comprises a plurality of gears which mesh with each other. For this reason, even if the rotational speed of the stepping motor is controlled with high precision, there is a case where a step movement rate varies due to a meshing tolerance of these gears. If the step movement rate is not uniform, an interval between adjacent two main scanning operations (hereinafter referred to just as a main scanning interval) becomes irregular, whereby troublesome striped patterns occur in an image to cause a deterioration of an image quality thereof.

Taking such circumstances into consideration, it is an object of the present invention to provide an image scanning apparatus which can restrict unevenness in rotation of a transmission system, and can substantially make constant a main scanning interval so as to prevent a deterioration of an image quality.

To achieve the above object, the invention described in claim 1 provides an image scanning apparatus comprising: a drive motor; sub-scanning means for relatively and intermittently moving a main scanning unit and a recording medium stepwise when a driving force of the motor is transmitted; and main scanning means for effecting a main scanning operation by driving the main scanning unit each time a sub-scanning operation is stopped, wherein the image scanning apparatus further includes transmission means which is composed of a plurality of gears meshing with each other, and varies a rotational speed of the motor so that the driving force thereof is transmitted to the sub-scanning means, and is characterized in that one integer rotation of a selected one of the plurality of gears is adapted to be set as one step of a sub-scanning movement in the step movement.

In accordance with the present invention described in claim 1, the gear is not strictly driven at an equal linear velocity within one rotation; for this reason, there is unevenness in the rotation due to a runout tolerance in a diameter direction. But an average linear velocity for one rotation is constant, and therefore, a feeding rate per one rotation is also constant. Based on this fact, one rotation is taken as a unit, and an integer rotation is set as one step of sub-scanning movement, whereby even if an error is caused in the moving rate of sub-scanning movement during its shifting movement, the sub-scanning operation is stopped at equal intervals when the main scanning operation is effected, preventing thereby an unevenness of the sub-scanning movement.

The number of teeth of gears is expressed by an integer. Therefore, if one gear is selected from the plurality of gears and an integer rotation of the selected gear (i.e., a rotation which usually makes constant a tooth position in the stopped state of the gear) is set as one step, an error which is normally caused when the same teeth are meshed with each other may be ignored.

For example, provided that the number of teeth of a gear (hereinafter, referred to as gear A) on a drive source side is 15 and the number of teeth of a gear (hereinafter, referred to as gear B) on an output side is 60, the relationship between the former (gear A) and the latter (gear B) is as shown in the following Table 1, and an error is converged at the number of rotation (a rotational speed) as shown in the Table 1.

TABLE 1

| The number of integer rotation of gear A | The number of rotation of gear B | Convergence of error |
|---|---|---|
| 1 (15 teeth) | ¼ | converged at 4 lines |
| 2 (30 teeth) | ½ | converged at 2 lines |
| 3 (45 teeth) | ¾ | converged at 4 lines |
| 4 (60 teeth) | 1/1 | converged at 1 line |

As can be seen from the above Table 1, if four rotations of the gear A is set as one step, the gear B makes one rotation, and both gears A and B make an integer rotation, and an error is converged every one line. This is the most preferable selection of the gear.

The invention described in claim 2 provides the image recording apparatus according to claim 1, in which the selected gear is a final step gear of the plurality of gears connected.

In accordance with the invention described in claim 2, claim 1 has shown that an error may be converged at some few lines in number. Further, in the case where gears are connected to each other, there is the need of taking all the number of teeth of the gear connected in the downstream side of the selected gear into consideration. In the case where one gear is selected from the plurality of connected gears, if the final step gear thereof is selected, the only selected gear may be controlled so as to make an integer rotation; therefore, adjustment can be readily performed. In the above description, if the gear B is the final step gear, an error is constantly converged every one line, and a stable sub-scanning operation can be effected.

The invention described in claim 3 provides the image recording apparatus according to claim 1 or 2, in which the plurality of gears have the number of teeth which is set in such a manner that two of those gears meshing with each other make an integer rotation.

In accordance with the invention described in claim 3, the rotation of the gear is set so as to make an integer rotation. In this case, the sub-scanning moving rate is actually an extremely small value; for this reason, deceleration is a basic concept. If the gear on a drive side is set so as to make an integer rotation each time the gear on an output side makes one rotation, a duration until an error is converged can be shortened.

The invention described in claim 4 provides the image recording apparatus according to any one of claims 1 to 3, in which an index indicative of the peak point of an error on a plus side is marked preliminarily onto one of the two gears meshing with each other and an index indicative of the peak point of an error on a minus side is preliminarily marked onto the other, and the two gears mesh with each other so that the two peak points meet each other.

In accordance with the invention described in claim 4, it is preferable that an error is offset when gears mesh with each other. An index indicative of the peak point of the error on a plus side and an index indicative of the peak point of the error on a minus side are previously marked onto one and the other of the two gears meshing with each other, respectively. And then, the aforesaid two gears are meshed with each other so that the above two peak points meet each other, and by doing so, the error can be restricted by the minimum limitation even though a reference gear (e.g. a gear in which its one rotation is set as one sub-scanning) is not the final step gear.

DETAILED DESCRIPTION OF THE PREFERRED EMBODIMENTS

Overall Structure (Exterior View)

Figure 1:
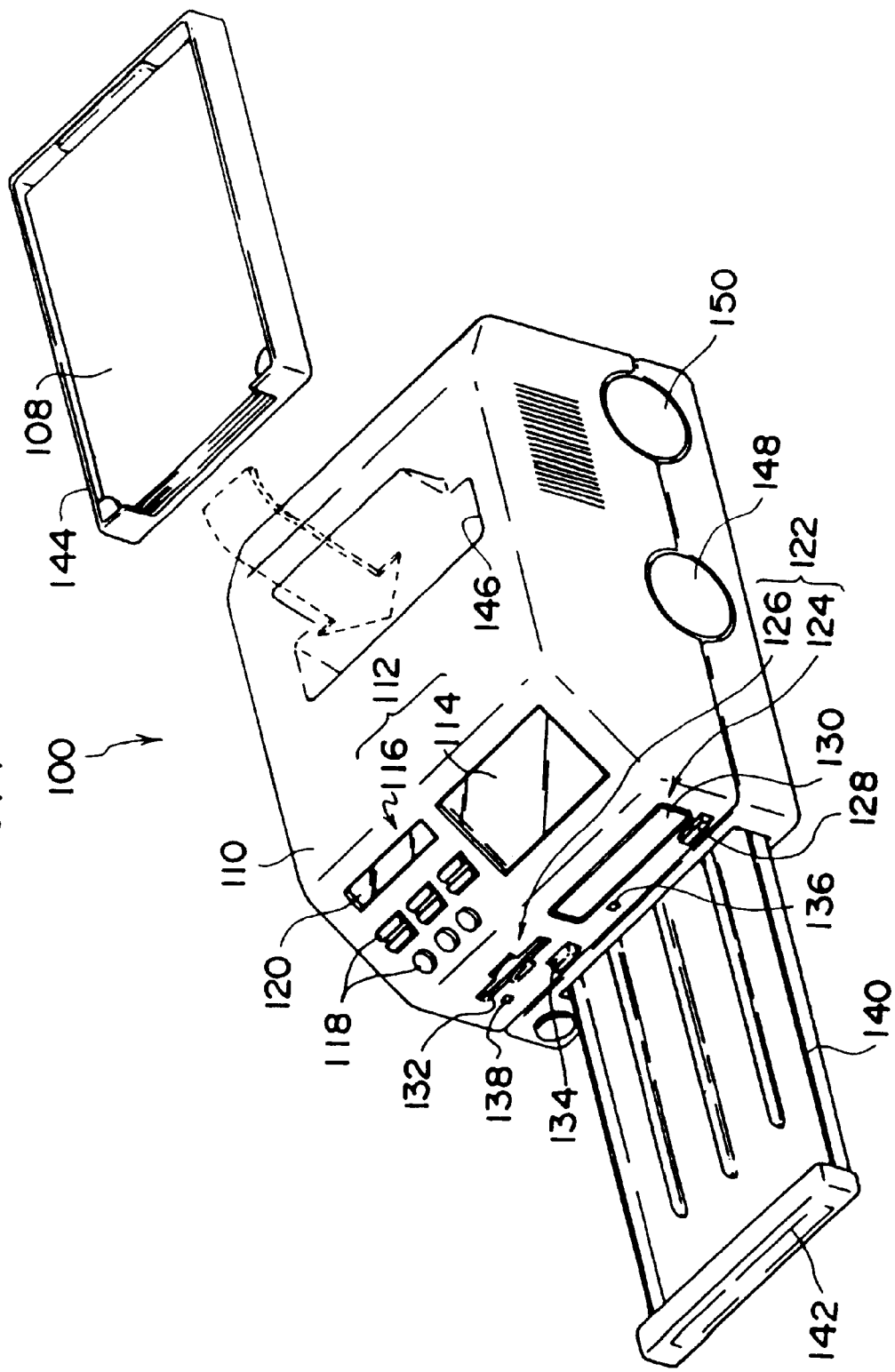
FIG. 1 is a perspective view of an image recording apparatus according to an embodiment of the present invention.
Figure 2:
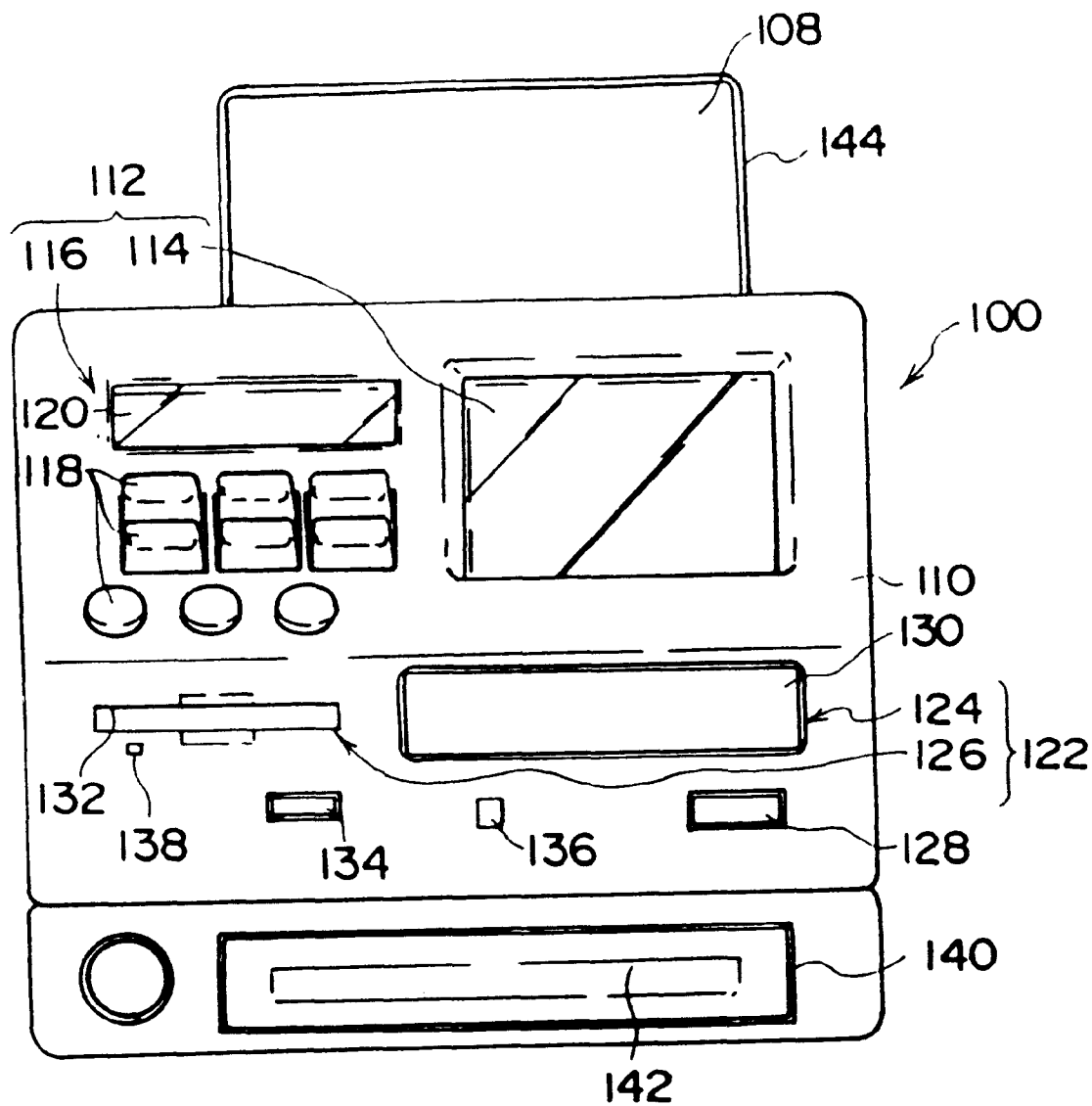
FIG. 2 is a front view of the image recording apparatus according to the embodiment of the present invention.
Figure 3:
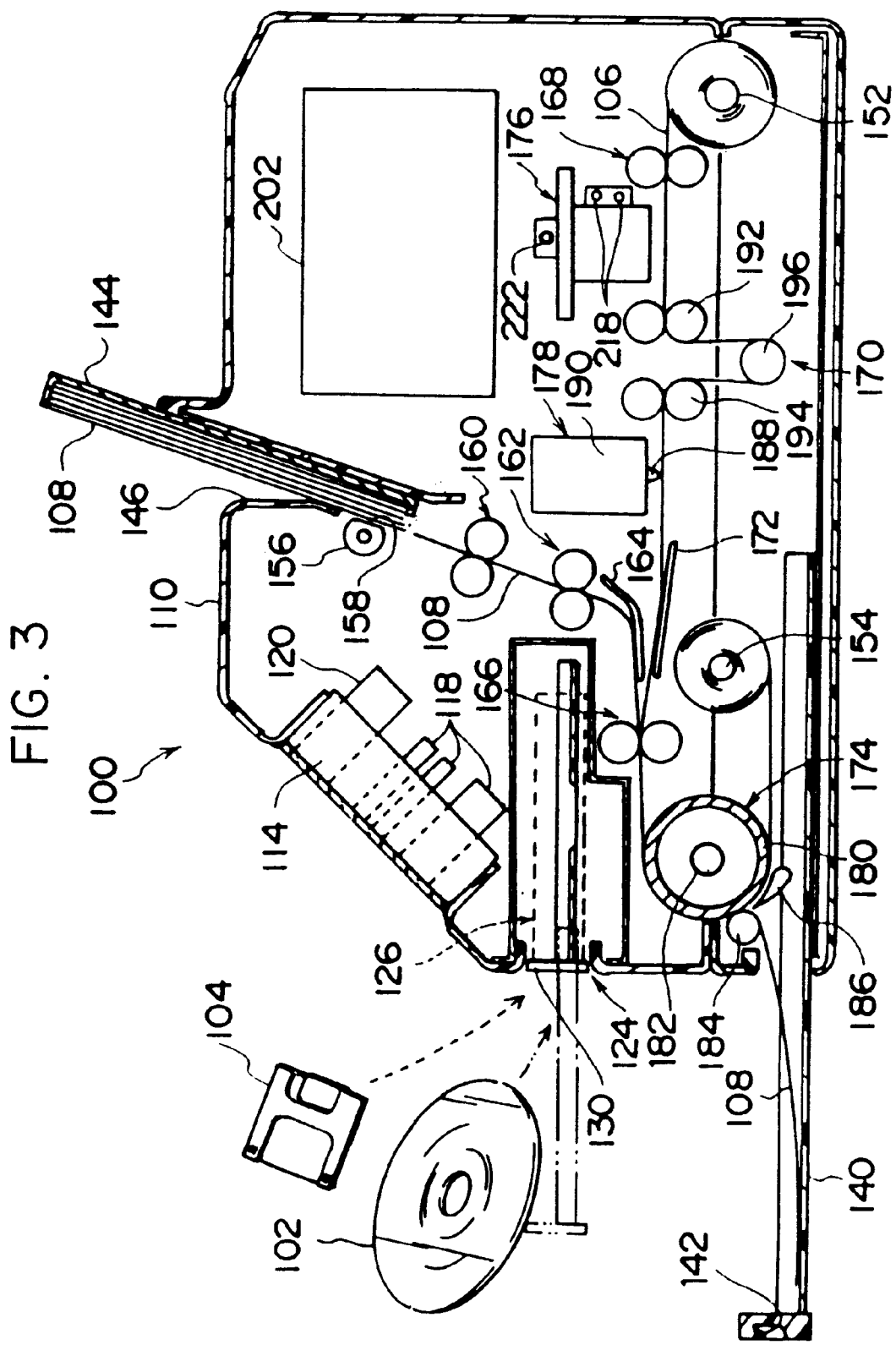
FIG. 3 is a cross-sectional side view showing an internal structure of the image recording apparatus according to the embodiment of the present invention.

Referring now to FIGS. 1 to 3, an image recording apparatus 100 according to the preferred embodiment of the present invention is shown therein.

The image recording apparatus 100 reads image data recorded on an optical disk 102 and an FD 104 (see FIG. 3) to expose onto a photosensitive material 106, and transfers an image recorded on the photosensitive material 106 to an image receiving paper 108 and outputting the image receiving paper.

An upper portion of the front surface of a box-shaped casing 110 (left-hand side in FIG. 3) is formed as an inclined surface, and an operation indicating portion 112 is provided thereon.

As shown in FIG. 2, the operation indicating portion 112 is divided into a monitor portion 114 and an input portion 116 which are disposed on right and left sides, respectively. The monitor portion 114 allows the read image to be projected thereon.

The input portion 116 is composed of a plurality of operation keys 118 and a display portion 120 for confirmation of input data, and allows input of data which is required for image recording, for example, the number of sheets to be recorded, size setting, color-balance adjustment, negative/positive selection, and the like.

A deck portion 122 is provided below the operation indicating portion 112. The deck portion 122 is composed of an optical-disk deck portion 124 and an FD deck portion 126 which are disposed at right and left sides of FIG. 2, respectively.

The optical-disk deck portion 124 is provided in such a manner that a tray 130 can be opened and closed by pressing an open/close button 128. An optical disk 102 can be loaded in an interior of the apparatus in such a manner as to be placed on the tray 130.

On the other hand, an FD insertion slot 132 is provided in the FD deck portion 126. When the FD 104 is inserted into the FD insertion slot, a drive system of the apparatus is actuated so as to insert the FD 104 into the apparatus. Further, in order to take out the FD 104 from the FD deck portion 126, an operation button 134 is pressed to pull out the FD 104.

Access lamps 136 and 138 are respectively provided for the optical-disk deck portion 124 and the FD deck portion 126 so that they are each turned on during access in the apparatus.

A discharge tray 140 is provided further below the deck portion 122. The discharge tray 140 is usually accommodated in the apparatus, and is provided so as to be pulled out by an operator's finger being put on a holding portion 142 (see FIG.

The image receiving paper 108 on which the image is recorded is discharged onto the discharge tray 140.

The image receiving paper 108 is previously accommodated on a tray 144 in a layered form. The tray 144 is loaded into a tray mounting hole 146 formed on an upper surface of the casing 110. The image receiving papers 108 are taken out one by one from the tray 144 mounted in the tray mounting hole 146, and after images are transferred onto the image receiving papers 108, these image receiving papers 108 are guided to the discharge tray 140.

Two circular cover members 148 and 150 are attached to the right side surface of the casing 110 (toward the front side on the paper of FIG. 1). These cover members 148 and 150 are each provided so as to be independently movable. As shown in FIG. 3, a feed reel 152 and a take-up reel 154 onto which the rolled photosensitive material 106 is wound are respectively disposed in the apparatus along axial directions of the cover members 148 and 150. These reels 152 and 154 can be taken out from or loaded into the apparatus in a state in which the cover members 148 and 150 are removed therefrom.

Image Receiving Paper Conveying System

As shown in FIG. 3, the tray 144 loaded in the tray mounting hole 146 is set so that an upper surface of the leading end of the tray faces a semicircular roller 156.

The semicircular roller 156 is formed in such a state that a cylindrical roller is cut along a plane parallel to an axis thereof. Usually, a cutting surface 158 of the semicircular roller 156 faces an uppermost image receiving paper 108 in the tray 144 at a predetermined interval. When the semicircular roller 156 rotates, the image receiving paper 108 of the uppermost layer and peripheral surface of the semicircular roller 156 contact with each other, and then, the image receiving paper 108 is pulled out by a small amount when the semicircular roller 156 makes one rotation. The pulled-out image receiving paper 108 is nipped by a first roller pair 160, and is completely pulled out from the tray 144 by a driving force of the first roller pair 160.

A second roller pair 162, a guide plate 164 and a third roller pair 166 are successively disposed at the downstream side of the first roller pair 160. The image receiving paper 108 is, after having been nipped by the first roller pair 160, nipped by the second roller pair 162, guided by the guide plate 164, and then, is further nipped by the third roller pair 166.

In the third roller pair 166, the image receiving paper 108 overlaps with the photosensitive material 106. Namely, the third roller pair 166 is also used as a conveying path of the photosensitive material 106.

Photosensitive Material Conveying System

The photosensitive material 106 is accommodated in the apparatus in a state of being elongated and wound onto the feed reel 152 in a layered form. The feed reel 152 is mounted at a predetermined position in such a manner that the cover member 150 (on the rear side of the apparatus) is removed and the feed reel 152 is inserted into the apparatus in the axial direction thereof.

With the photosensitive material 106 being mounted at the predetermined position, loading of the photosensitive material 106 is effected along a predetermined conveying path in a state that the outermost layer of the photosensitive material 106 is pulled out as an initial setting. The photosensitive material 106 is loaded in the following procedure that the outermost layer thereof is pulled out from the feed reel 152, nipped by a fourth roller pair 168 situated in the vicinity of the feed reel 152, conveyed through a reservoir portion 170 and a guide plate 172, and is nipped by the third roller pair 166, and thereafter, the outermost layer is successively wound onto a heat roller 174 and a take-up reel 154. In this case, a leader tape having a length required for loading may be provided at the leading end portion of the photosensitive material 106 wound onto the feed reel 152.

On the conveying path of the photosensitive material 106, an exposure section 176 is provided between the fourth roller pair 168 and the reservoir portion 170. Further, a water applying portion 178 is provided between the reservoir portion 170 and the guide plate 172. The exposure section 176 and the water applying portion 178 will be described later in detail. After the image has been exposed onto the photosensitive material 106 in the exposure section 176, the photosensitive material 106 overlaps with the image receiving paper 108 at the third roller pair 166 in a state in which water is applied to an emulsion surface (i.e., a surface to be exposed) of the photosensitive material.

Figure 6:
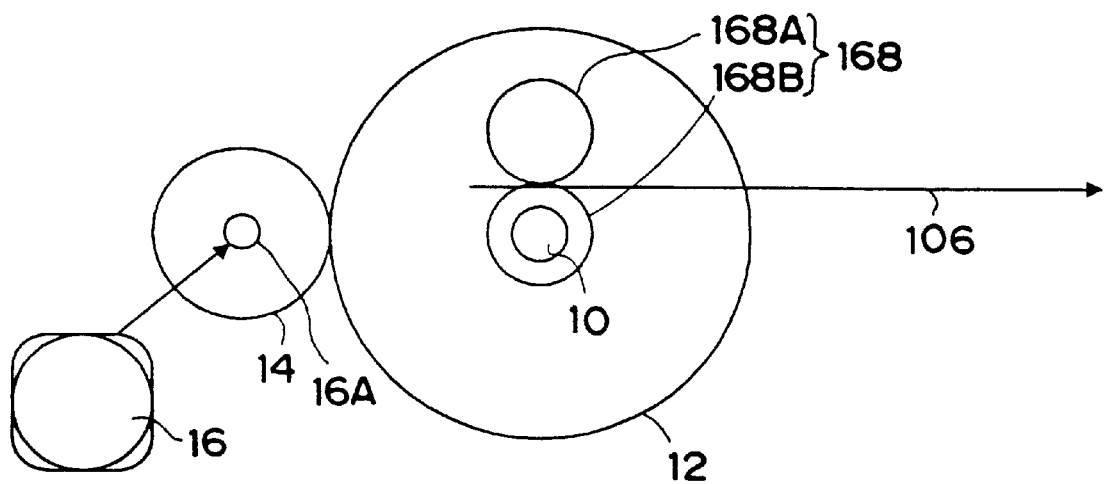
FIG. 6 is a schematic view showing a drive system for driving a roller pair.

Referring now to FIG. 6, there is schematically shown a drive system for driving the aforesaid fourth roller pair 168. One (e.g. an upper side roller) of the roller pair 168 is an idle roller 168A; the other (e.g. a lower side roller) thereof is a drive roller 168B.

A first gear 12 which constitutes a part of a transmission system means is coaxially attached to the rotary shaft 10 of the drive roller 168B so that the drive roller 168B can be coaxially rotated with the rotation of the first gear 12.

The first gear 12 engages with a second gear 14 which constitutes the transmission system together with the first gear 12. In this case a gear ratio of the first gear 12 to the second gear 14 is set to 4:1. Specifically, for example, if the second gear 14 has 20 teeth in its number, the number of teeth of the first gear 12 has 80 teeth, which is a multiplied integer of 20.

The second gear 14 is attached to a rotary shaft 16A of a stepping motor 16 used as a drive source, and is rotated in accordance with a rotation of the stepping motor 16.

When the stepping motor 16 is rotated, a rotating force is transmitted to the drive roller 168A through the second gear 14 and the first gear 12, and then the roller pair 168 is rotated, so that the photosensitive material 16 nipped by the roller pair 168 can be conveyed.

In general, since a gear has characteristics such that it is not strictly driven at an equal linear velocity within one rotation; for this reason, there is unevenness due to a runout tolerance in a diameter direction. However, as an average linear velocity every one rotation is constant, a feeding rate per one rotation is also constant.

Figure 7:
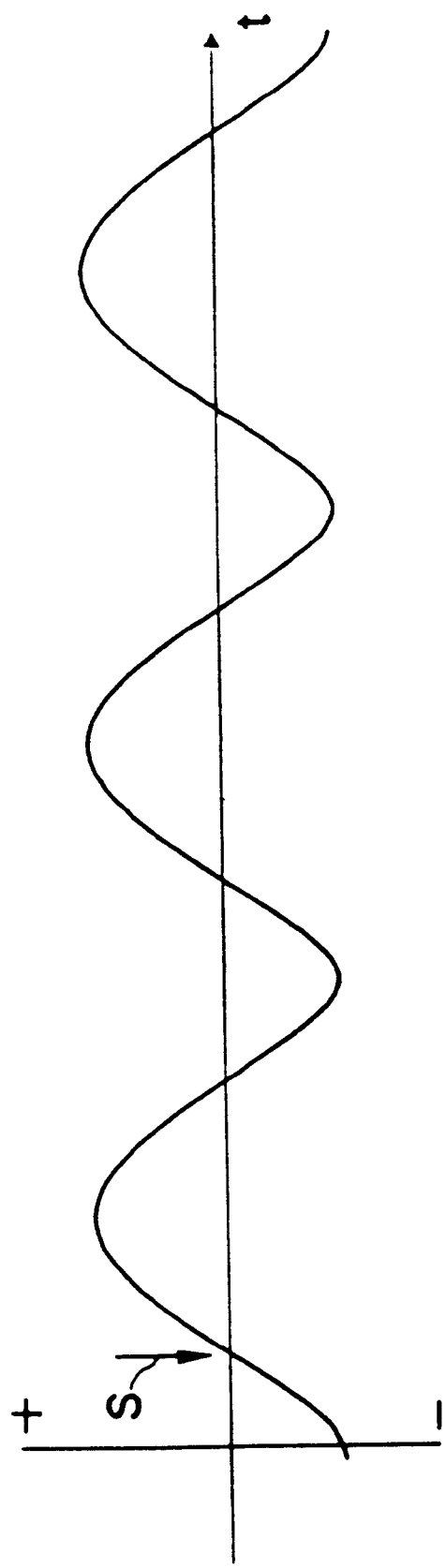
FIG. 7 is a characteristic chart showing a linear velocity error when a first gear is rotated.

FIG. 7 shows unevenness of the linear velocity when the first gear 12 is rotated. In this case, the gear characteristic is shown in the form of a sine wave because unevenness in a linear velocity of every predetermined tooth is substantially constant. Actually, the gear characteristic is not shown as an accurate sine wave. Further, in FIG. 7, an abscissa takes a time; on the other hand, an ordinate takes an error. An upper side of the ordinate is an error on a plus side, while a lower side thereof is an error on a minus side.

As shown in FIG. 7, assuming that a start position of one rotation is indicated by an arrow S of FIG. 7, it can be seen that no error in every one cycle occurs therein, and an average linear velocity in every one rotation is constant.

For this reason, in the case where a movement rate of the sub-scanning is set by use of the stepping motor 16, an integer rotation of the first gear 12 is controlled so as to be set as one step of a sub-scanning movement.

Moreover, in the case where the transmission system is composed of a plurality of gears (first gear 12, second gear 14) like this embodiment, the number of teeth of the plurality of gears is set such that one (first gear 12) of two gears which are engaged with each other makes an integer rotation while the other (second gear 14) thereof makes one rotation.

Figure 8:
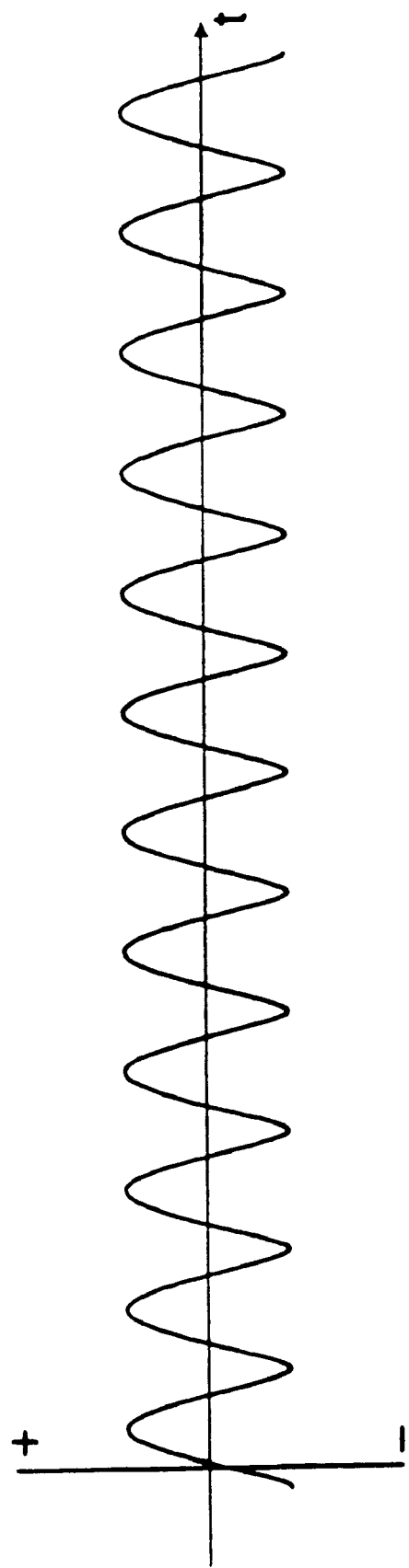
FIG. 8 is a characteristic chart showing a linear velocity error when a second gear is rotated.

In FIG. 8, there is shown unevenness of a linear velocity when the second gear 14 is rotated. The condition or the like is the same as the first gear 12.

Figure 9:
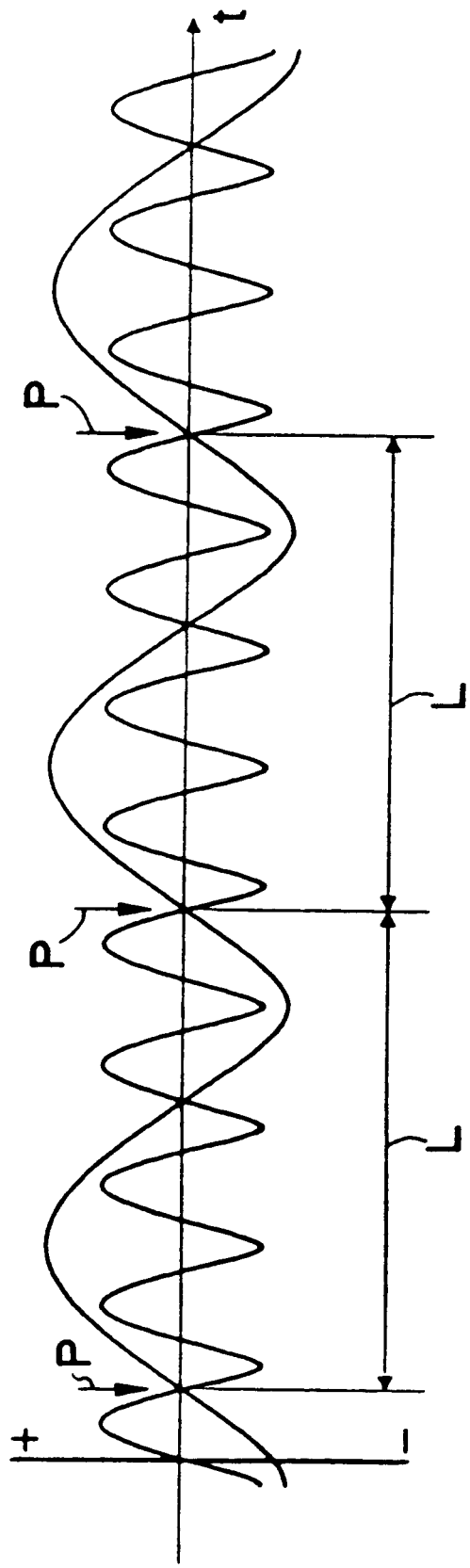
FIG. 9 is a characteristic chart combining linear velocity errors of the first and second gears.

As shown in FIG. 8, a frequency of the second gear 14 is higher than that of the first gear 12, wherein smaller and shorter sine waves are repeated more frequently. However, four cycles of the second gear 14 coincides with the first gear 12 at a point (see an arrow "P" of FIG. 9) where there is no discrepancy therebetween. In other words, the first gear 12 returns to an initial state at every one rotation, so that an error accumulation is avoided.

Heat Roller

The heat roller 174 serves as a heat development transfer section of the present apparatus, and is composed of a cylindrical roller main body 180 and a heater 182 which is provided in the roller main body 180 along the axial direction of the roller main body. Further, the heat roller 174 serves to apply heat to members wound onto the roller main body 180 (i.e., the photosensitive material 106 and the image receiving paper 108) in such a manner that the surface of the roller main body 180 is heated by actuation of the heater 182. The heating of the heat roller 174 allows heat development transfer processing, and the image recorded on the photosensitive material 106 is thereby transferred onto the image receiving paper 108.

A peeling roller 184 and a peeling claw 186 are disposed in the vicinity of a lower right side of the heat roller 174, and are provided so as to separate, from the photosensitive material 106, the image receiving paper 108 wound onto the heat roller 174 by a length of about one third (⅓) of the overall circumference of the heat roller 174 to guide the image receiving paper 108 toward the discharge tray 140.

On the other hand, the photosensitive material 106 is wound onto the heat roller 174 by a length of about a half (½) the overall circumference of the heat roller 174, and is turned to an opposite direction so as to be guided to a position where the take-up reel 154 is mounted.

Water Applying Portion

As shown in FIG. 3, the water applying portion 178 operates to apply water, serving as an image forming solvent, onto the photosensitive material 106 or the image receiving paper 108 to allow overlapping surfaces of the photosensitive material 106 and the image receiving paper 108 to closely adhere to each other for heat development. Further, the water applying portion 178 is composed of an applying member 188 extending along a transverse (widthwise) direction of the photosensitive material 106 and a tank 190 in which water is filled.

The applying member 188 is formed of a high absorptive material such as felt, sponge or the like, having a proper degree of hardness, and is provided so as to contact with the photosensitive material 106 at a predetermined pressure during conveying of the photosensitive material 106. Water filled in the tank 190 is constantly supplied to the applying member 188 by a proper amount by taking advantage of a capillary phenomenon. When the photosensitive material 106 and the applying member 188 contact with each other, water is applied onto the surface (i.e., the emulsion surface) of the photosensitive material 106 by means of the applying member 188.

Further, since the applying member 188 abuts against the photosensitive material 106 at a proper pressure, water is uniformly applied to the photosensitive material 106.

Replenishment of water into the tank 190 is effected in such a manner that the entire water applying portion 178 is removed from the apparatus, but water may be constantly supplied from an exterior of the apparatus by using a pipe arrangement.

Meanwhile, in the present embodiment, water is used as the image forming solvent, but the water used in this embodiment is not limited to pure water and also includes water which is widely and generally used. Further, a mixed solvent of water and a low-boiling-point solvent such as methanol, DMF, acetone, diisobutylketone or the like may be used. Moreover, a solution which contains an image formation accelerator, an anti-fogging agent, a development stopping agent, hydrophilic heat solvent or the like may also be used.

Exposure Section

Figure 4:
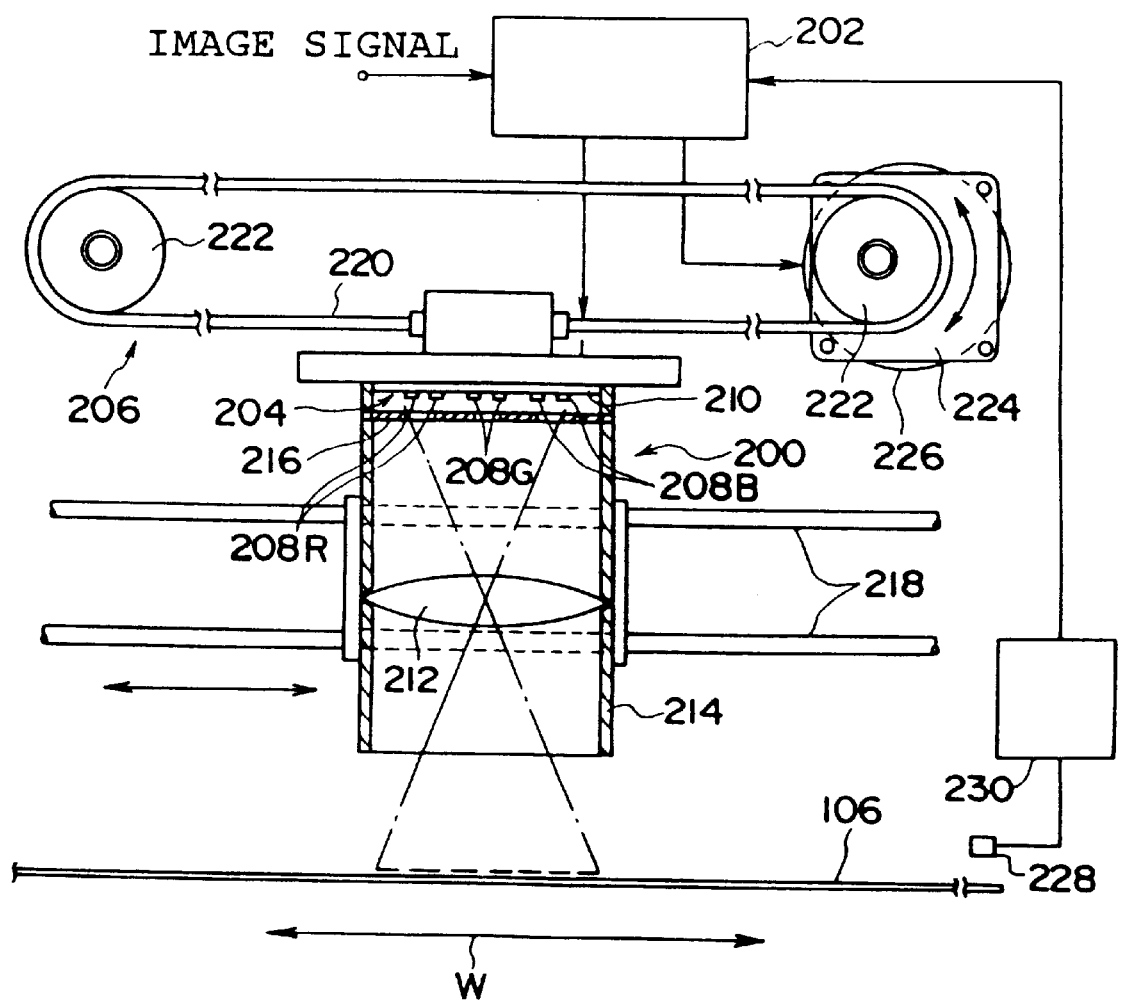
FIG. 4 is a front view showing a schematic structure of an exposure section.

In FIG. 4, there is shown an exposure section 176 according to the present embodiment.

The exposure section 176 is mainly formed of a light source unit 200 which is provided above the conveying path of the photosensitive material 106, and is connected to a controller 202. The controller 202 is provided with a memory in which an image signal (the image signal read from the optical disk 102 or FD 104) is stored, and turns on a light source portion 204 in the light source unit 200 in accordance with the image signal. The light source unit 200 is movable in the transverse direction (main scanning direction) of the photosensitive material 106 by a drive of a main scanning unit 206 which will be described later. The main scanning operation is effected when the photosensitive material 106 is step-driven and stops in the exposure section 176.

The light source unit 200 of the exposure section 176 is covered by a box-shaped exposure casing 214. The light source portion 204 is disposed on the upper end surface of the exposure casing 214, and a light emission surface of the light source portion 204 is directed toward an interior of the exposure casing 214. An aperture 216 is provided for each of colors on the side of the light emission surface of the light source portion 204 so as to limit scattering of light from a plurality of LED chips 208. Meanwhile, the structure having no aperture 216 may also be provided.

A telecentric lens 212 is provided on the lower side of the aperture 216 and at the central portion of the exposure casing 214, and serves to converge a light from the light source portion 204 so as to form an image on the photosensitive material 106. Meanwhile, the resolution of an image thus formed is about 250 to 400 dpi.

The telecentric lens 212 is composed of a plurality of lenses and a diaphragm, and has characteristics in which magnification thereof does not vary even when the height of an image surface changes. The telecentric lens 212 can eliminate an error possibly caused by a vibration generated during the main scanning movement made by the main scanning unit 206, and that caused by a state in which the exposure casing 214 is mounted.

Further, the focus of the telecentric lens 212 is constantly adjusted by means of an automatic focusing mechanism (not shown). Alternatively, the telecentric lens 212 may also be formed as a lens system whose depth of focus is large so as to eliminate the need of adjustment of the focus.

The light source unit 200 is supported by a pair of guide shafts 218 which are disposed parallel to each other and forming a part of the main scanning unit 206. The guide shafts 218 are provided along the transverse direction of the photosensitive material 106 (i.e., the direction indicated by an arrow W in FIG. 4). The light source unit 200 is guided by the guide shafts 218 so as to be movable in the transverse direction of the photosensitive material 106.

A portion of an endless timing belt 220 is fixed at the exposure casing 214 of the exposure section 204. The timing belt 220 is entrained onto sprockets 222 positioned in the vicinity of both ends of the pair of guide shafts 218. A rotary shaft of one of the sprockets 222 is connected via a transmission 224 to a rotary shaft of a stepping motor 226. The light source unit 200 is moved along the guide shafts 218 by a reciprocating rotation of the stepping motor 226.

The drive of the stepping motor 226 is controlled by the controller 202, and is synchronized with the step driving of the photosensitive material 106. Specifically, in a state in which the photosensitive material 106 is move by one step and stops, the stepping motor 226 starts rotating to move the light source portion 204 on the photosensitive material 106 along the transverse direction of the photosensitive material 106. When the stepping motor 226 is rotated in the reverse direction after a predetermined number of pulses has been confirmed, the light source portion 204 returns to its original position. And thereafter, a subsequent movement of the photosensitive material 106 starts synchronously with the returning motion of the light source portion 204.

A photodiode 228 is provided at the side where a light is emitted from the light source portion 204 so as to face the photosensitive material 106, and outputs a signal corresponding to a quantity of light from the light source portion 204 in which light has been received. The photodiode 228 is connected to a light-quantity correction unit 230, and the signal corresponding to the quantity of light is inputted to the light-quantity correction unit 230.

The light-quantity correction unit 230 compares the quantity of light from the LED chips 208 of each of the detected colors with a quantity-of-light value predicted from a correcting fixed signal so as to adjust density and color balance, and further, outputs a correction value to the controller 202. The image signal to be transmitted to the light source portion 204 is corrected on the basis of the correction value, and each LED chip 208 is then turned on at a proper quantity of light.

Figure 5:
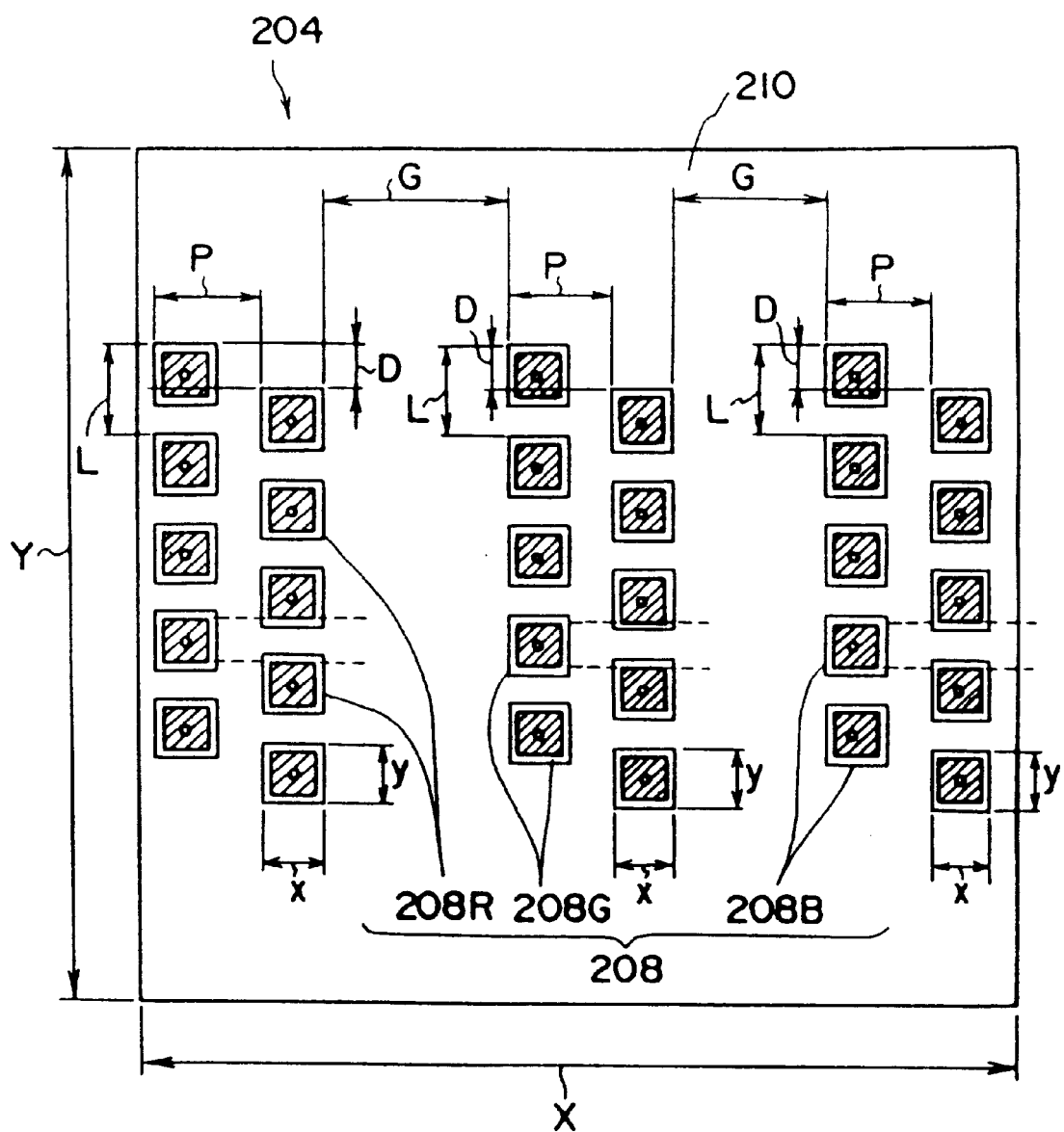
FIG. 5 is a plan view showing a light source portion of the exposure section.

As shown in FIG. 5, the light source portion 204 is formed with a plurality of LED chips 208 being arranged in group. These LED chips 208 which emit light of colors of blue (B), green (G) and red (R) (when described below for each of the colors, the LED chip which emits light of blue is referred to as B-LED chip 208B, the LED chip which emits light of green is referred to as G-LED chip 208G, and the LED chip which emits light of red is referred to as R-LED chip 208R) are mounted onto a substrate 210 along the transverse direction of the photosensitive material 106 (i.e., the main scanning direction) for each of the colors in accordance with the same arrangement rule. Meanwhile, the wavelength of light from the R-LED chip 208R is 650±20 nm, the wavelength of light from the G-LED chip 208G is 530±30 nm, and the wavelength of light from the B-LED chip 208B is 470±20 nm.

On the substrate 210 in the plan view shown in FIG. 5, ten B-LED chips 208B are arranged in two rows and in a zigzag manner at the right end, ten R-LED chips 208R are arranged in two rows and in a zigzag manner at the left end, and ten G-LED chips 208G are arranged in two rows and in a zigzag manner at the central position. Namely, the totaled six rows of LED chips 208 are arranged.

A predetermined wiring arrangement is provided on the substrate 210 by etching processing or the like, and each wire is covered by metal for heat dissipation so as not to cause a short circuit between the wires. For this reason, generation of heat due to the LED chips 208 being turned on can be restricted, and variation of an amount by which light is emitted can also be limited.

The dimension of each of parts of the light source portion 204 applied to the present embodiment are as follows.

The horizontal and vertical dimensions (XXY) of the substrate 210 are 5×5 mm (maximum) and the outer dimension of each LED chip 208 (xxy) are about 360×360 μm. The row pitch P of the same color LED chips is 600 μm, the line pitch L of each row of the LED chips is 520 μm, and the distance D of a stepped portion formed in the zigzag arrangement along the vertical direction of the substrate is 260 μm. The distance G of a space between the adjacent groups of LED chips cannot be univocally determined, but is determined by the telecentric lens 212. Preferably, the respective distances G between the R-LED chips 208R and the G-LED chips 208G and between the G-LED chips 208G and the B-LED chips 208B are equal to each other.

The diagonal line section of each of the LED chips 208 shown in FIG. 5 is a region from which light is actually emitted. As shown by the chain line of FIG. 5, borders of the light emission region in the adjacent rows of LED chips formed in the zigzag arrangement are provided to correspond to each other.

The light source portion 204 having the above-described structure allows recording of ten main scanning lines by one main scanning operation for each of colors on the photosensitive material 106. For this reason, a step movement of the photosensitive material 106 is controlled such that the photosensitive material 106 is driven and stopped repeatedly at a pitch of ten times of the width of a main scanning line recorded thereon.

Reservoir Portion

The reservoir portion 170 is, as described above, disposed between the exposure section 176 and the water applying portion 178, and is composed of two pairs of nip rollers 192 and 194 and one dancer roller 196. The photosensitive material 106 is entrained between the two pairs of nip rollers 192 and 194, and a substantially U-shaped slack portion is formed in the photosensitive material 106 between these pairs of nip rollers. The dancer roller 196 moves up and down correspondingly to the slack portion to hold the slack portion of the photosensitive material 106.

In the exposure section 176, the photosensitive material 106 is moved in a stepwise manner, but in the water applying portion 178, it is necessary that the photosensitive material 106 be conveyed at a fixed speed so as to allow uniform application of water onto the photosensitive material 106. For this reason, the difference in the conveying speed of the photosensitive material 106 is generated between the exposure section 176 and the water applying portion 178. In order to eliminate the difference in the conveying speed, the dancer roller 196 moves up and down to adjust an amount of slack formed in the photosensitive material 106 so that the stepwise movement and the constant-speed movement of the photosensitive material 106 can thereby be carried out synchronously.

Next, an operation of the present embodiment will be described.

An overall flow of an image recording operation will first described below.

In a state in which the tray 144 is loaded in the tray mounting hole 146, the feed reel 152 onto which the photosensitive material 106 is completely taken up and the take-up reel 154 which is an empty state are mounted at respective predetermined positions, and when a printing start key of the operation indication portion 112 is operated in a loading completed state, the controller 202 reads and stores image data from the optical disk 102 or the FD 104.

When the image data is stored in the controller 202, the feed reel 152 is driven to start conveying the photosensitive material 106.

When the photosensitive material 106 reaches a predetermined position in the exposure section 176, the photosensitive material 106 is temporarily stopped, and thereafter, image signals of ten lines are outputted from the controller 202 to the light source portion 204. The image signals are outputted every ten lines, and the light source portion 204 is guided by the guide shaft 218 by the drive of the stepping motor 226 so as to move along the transverse direction of the photosensitive material 106 (main scanning) Prior to the outputting of the image signal, the quantity of light for each of the colors from the light source portion 204 is detected by means of the photodiode 228, and in the light-quantity correction unit 230, a correction value for adjustment of density, color balance and the like is supplied to the controller 202, to thereby correct the image signal. The correction of the image signal is carried out for each image.

When first main scanning is completed, the photosensitive material 106 is moved by one step (10-lines pitch) and stops, and subsequently, second main scanning is effected. By repeating the above main scanning, an image of one frame is recorded on the photosensitive material 106. The photosensitive material 106 on which the image has been recorded is held by a drive of only upstream side nip roller pair 192 in the reservoir portion 170 (a downstream side nip roller pair 194 is stopped) in the state of having a slack portion in the reservoir portion 170 to be entrained onto the dancer roller 196. For this reason, the above photosensitive material 106 is not provided to reach the water applying portion 178.

When the photosensitive material 106 having a length of one image is accumulated in the reservoir portion 170, the nip roller pair 194 at the downstream side of the reservoir portion 170 start driving. As a result, the photosensitive material 106 (recording of images thereon has been completed) is conveyed to the water applying portion 178. In the water applying portion 178, the photosensitive material 106 is conveyed at a constant speed, and water is uniformly applied to the photosensitive material 106 by means of the applying member 188.

Water is constantly conveyed from the tank 190 to the applying member 188, and the photosensitive material 106 is pressed by the applying member 188 at a predetermined pressure. Thus, a proper amount of water is applied to the photosensitive material 106.

The photosensitive material 106 to which water is applied is guided by means of the guide plate 172, and then, is conveyed to the third roller pair 166.

On the other hand, the peripheral surface of the semicircular roller 156 and the leading end of the image receiving paper 108 contact with each other by one rotation of semicircular roller 156, and thereafter, the image receiving paper 108 of the uppermost layer is pulled out and is nipped by the first roller pair 160. The image receiving paper 108 is pulled out from the tray 144 by being driven by the first roller pair 160, and waits for arrival of the photosensitive material 106 in the state of being nipped by the second roller pair 162.

Synchronously with the passing of the photosensitive material 106 through the guide plate, the first roller pair 160 and the second roller pair 162 start driving, and the image receiving paper 108 is guided by the guide plate 164 and conveyed to the third roller pair 166.

The photosensitive material 106 and the image receiving paper 108 are nipped by the third roller pair 166 in an overlapping state, and are conveyed to the heat roller 174. At this time, photosensitive material 106 and the image receiving paper 108 closely adhere to each other by water applied to the photosensitive material 106.

The photosensitive material 106 and the image receiving paper 108 in the above overlapping manner are entrained onto the heat roller 174, and are subjected to heat from the heater 182 for heat development transfer processing. In other words, the image recorded on the photosensitive material 106 is transferred onto the image receiving paper 108 so as to form an image on the image receiving paper 108.

The heat development transfer processing is completed in the state in which the image receiving paper 108 is wound onto the heat roller 174 by a length of about one third (⅓) the entire circumference of the roller, and subsequently, the image receiving paper 108 is separated from the photosensitive material 106 by means of the peeling roller 184 and the peeling claw 186, and is discharged onto the discharge tray 140 in the state of being wound onto the peeling roller 184.

On the other hand, the photosensitive material 106 is wound onto the heat roller 174 by a length of about a half the overall circumference of the roller, and thereafter, the photosensitive material 106 moves in the tangential direction and is wound onto the take-up reel 154.

In the apparatus according to the present embodiment, image recording operation is effected with a compact structure, and also, the optical disk deck portion 124 and the FD deck portion 126 are mounted in the apparatus, so that image data can be rapidly taken in. Further, the image to be recorded can be checked by use of the monitor portion 114, so that density and color balance of the image can be easily adjusted.

Since the discharge tray 140 is of a type that can be accommodated in the apparatus, when the apparatus is unused, an even appearance of the apparatus can be obtained by removing the tray 144 accommodating the image receiving paper 108, so that a working space can be effectively utilized.

Moreover, in the apparatus according to the present embodiment, the water applying portion 178 and the exposure section 176 are fixed to the conveying direction of the photosensitive material 106, and their movement relative to the photosensitive material 106 is effected only by the movement of the photosensitive material 106, so that a movement mechanism can be simplified.

Here, in a step movement of the photosensitive material 106 according to the present embodiment, the meshing state of the first gear 12 and the second gear 14, which constitute the transmission system, is set as follows in order to sufficiently exhibit positioning precision of the stepping motor 16.

Specifically, the gear ratio of the first gear 12 attached to the rotary shaft 10 of the drive roller 168B to the second gear 14 engaging therewith is set to 4:1. The numeral itself of this gear ratio has no specific features, but a condition is set such that one of the gear ratio is an integer multiple of the other.

When the stepping motor 16 rotates, a rotating force of the stepping motor 16 is transmitted to the drive roller 168A through the second gear 14 and the first gear 12, and thereafter, the roller pair 168 is driven so as to convey the photosensitive material 106 held therebetween; however, an average linear velocity for each rotation is constant, and the feed rate per one rotation is also constant. Therefore, in case of setting a movement rate of sub-scanning by use of the stepping motor 16, if the integer rotation of the first gear 12 is controlled so as to be set as one step of the sub-scanning movement, the width of sub-scanning line can be kept constant.

Since the second gear 14 makes an integer rotation when the first gear 12 makes one rotation, the first gear 12 returns to the initial state per each rotation, so that an error accumulation can be eliminated.

Figure 10:
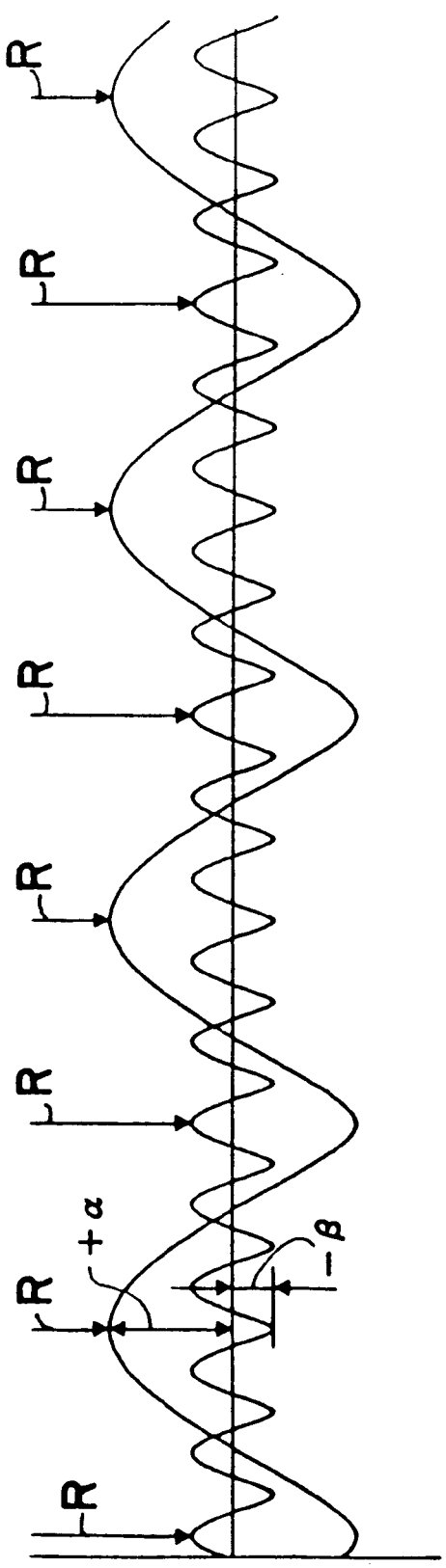
FIG. 10 is a characteristic chart a linear velocity error of a gear ratio for offsetting a plus side (mountain) error and a minus side (valley) error.
Figure 11:
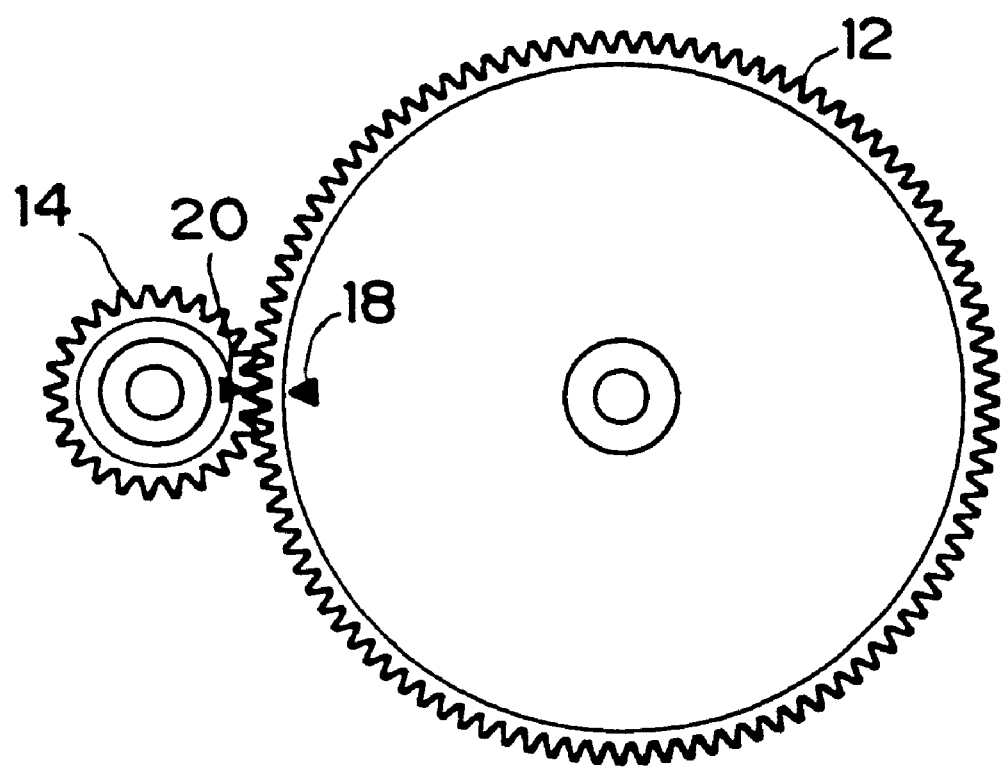
FIG. 11 is a plan view showing a case where an assembling index is disposed on the respective first and second gears.

As described above, in the case where the gear ratio of the first gear 12 and the second gear 14 is set or a meshing position is determined, even if the meshing position of these gears is determined at random, the effect as described above can be obtained. As shown in FIG. 10, the gear ratio is set such that some mountain portions of one gear and some valley portions of the other gear coincide at predetermined positions in the respective sine waves, and offset each other (α-β in FIG. 10) (see points shown by an arrow R in FIG. 10(A)). Further, as shown in FIG. 11, if an index 18 indicative of the peak position of a plus side (mountain side) is marked onto one (e.g. the first gear 12) and an index indicative of the peak position of a minus side (valley side) is marked onto the other (e.g. the second gear 14), the linear velocity during the sub-scanning operation (during movement of the photosensitive material 106) is stabilized. For example, even if the main scanning operation is effected while conveying the photosensitive material 106 as the need arises, lowering of the image quality can be prevented, and assembling work can be also improved.

Meanwhile, according to the present embodiment, the optical disk deck portion 124 and the FD deck portion 126 are mounted in the apparatus, but the apparatus may be provided with a deck portion which is capable of loading other recording medium (e.g. a magneto-optic disk (MO), a phase-change disk (PD), a video tape or the like). Further, the apparatus may be provided with an image input terminal which takes in image signals from exterior (e.g. a personal computer, television or the like).

In the present embodiment, LED chips 208 are arranged in a zigzag manner as the light source portion 204, but they may be arranged in one row of each of colors and lengthwise and crosswise. Further, the number of LED chips and the number of rows may be varied for each color.

As is evident from the above description, the image scanning apparatus of the present invention can restrict unevenness in rotation of a transmission, and can substantially make constant a sub-scanning interval so as to prevent lowering of an image quality.

What is claimed is:

1. An image scanning apparatus, comprising:
    a drive motor;
    sub-scanning means for intermittently moving at least one of a main scanning unit and a recording medium stepwise relative to one another when a driving force of the motor is transmitted; and
    main scanning means for effecting a main scanning operation by driving the main scanning unit each time a sub-scanning operation is stopped,
    said image scanning apparatus further including;
    transmission means which is composed of a plurality of gears meshing with each other for transmitting the driving force of said motor to said sub-scanning means, wherein an integer rotation of a selected one of said plurality of gears is adapted to be set as one step of a sub-scanning movement in said step movement.

2. The image scanning apparatus according to claim 1, wherein said selected gear is a final step gear of the plurality of gears connected.

3. The image scanning apparatus according to claim 2, wherein the plurality of gears have the number of teeth which is set in such a manner that two of said plurality of gears meshing with each other make an integer rotation.

4. The image scanning apparatus according to claim 2, wherein an index indicative of the peak point of an error on a plus side is marked preliminarily onto one of said two gears meshing with each other and an index indicative of the peak point of an error on a minus side is preliminarily marked onto the other, and said two gears mesh with each other so that the two peak points meet each other.

5. The image scanning apparatus according to claim 1, wherein the plurality of gears have the number of teeth which is set in such a manner that two of said plurality of gears meshing with each other make an integer rotation.

6. The image scanning apparatus according to claim 5, wherein an index indicative of the peak point of an error on a plus side is marked preliminarily onto one of said two gears meshing with each other and an index indicative of the peak point of an error on a minus side is preliminarily marked onto the other, and said two gears mesh with each other so that the two peak points meet each other.

7. The image scanning apparatus according to claim 1, wherein an index indicative of the peak point of an error on a plus side is marked preliminarily onto one of said two gears meshing with each other and an index indicative of the peak point of an error on a minus side is preliminarily marked onto the other, and said two gears mesh with each other so that the two peak points meet each other.

8. The image scanning apparatus according to claim 1, wherein the sub-scanning means is for intermittently moving at least one of the main scanning unit and recording medium stepwise relative to one another, in steps of substantially equal length, based on a substantially constant driving rate of the drive motor when the drive motor is operated.

9. An apparatus for scanning a recording medium, the apparatus comprising:
    (a) a scanning unit mounted movably for back and forth movement along a scanning direction;
    (b) a conveyor for receiving a recording medium and moving at least one of the recording medium and a scanning unit relative to one another along a conveyance path transverse to the scanning direction;
    (c) a drive motor having a plurality of gears meshing with one another, connecting the conveyor to the drive motor, which transmit rotational mechanical energy from the drive motor to the conveyor when the motor is operated, thereby operating the conveyor; and
    (d) a controller electronically connected to, and controlling, the drive motor and scanning unit, the controller operating the drive motor intermittently for scanning a recording medium, thereby causing the conveyor to move at least one of the recording medium and scanning unit relative to one another along the conveyance path in steps of substantially length, wherein an integer rotation of one of the plurality of gears substantially corresponds to one step along the conveyance path.

10. The apparatus according to claim 9, wherein the controller controls the drive motor to move at least one of the recording medium and scanning unit relative to one another along the conveyance path in substantially equal steps, based on a substantially constant drive rate of said drive motor when the motor is operated.

11. The apparatus according to claim 9, wherein the plurality of gears comprise a first gear directly driving the conveyor, and a second gear, directly driving the first gear, wherein a gear ratio of the first gear to the second gear is substantially equal to an integer greater than 1.

12. The apparatus according to claim 11, wherein said integer is 4.

13. The apparatus according to claim 9, wherein the plurality of gears comprise a first gear directly driving the conveyor, and a second gear, directly driving the first gear, and one rotation of the second gear corresponds to one said step.

14. The apparatus according to claim 9, wherein the conveyor includes a pair of opposing rollers, with one roller coaxially connected to one of the gears, and the conveyor conveys the recording medium by pressing against the recording medium as the roller rotates.

15. A method for scanning a recording medium, comprising the steps of:

(a) providing a conveyor for receiving a recording medium and moving at least one of the recording medium and a scan unit relative to one another along a path of travel in steps of substantially equal length;

(b) connecting a drive motor to the conveyor via a plurality of meshing gears, wherein an integer rotation of one of the plurality of gears substantially corresponds to one step;

(c) alternately switching the drive motor on and off to cause the conveyor to move at least one of the recording medium and scan unit relative to one another along the path of travel in said steps; and (d) in between steps, moving the scan unit transversely across the path of travel, and scanning the recording medium.

16. The method according to claim 15, further comprising the step of determining when the recording medium and scan unit have moved a length of one step relative to one another along said path of travel, based on a constant drive rate of the drive motor when the motor is operated.

17. The method according to claim 15, wherein the step of connecting a drive motor, includes providing a first gear of the plurality, connected for directly driving the conveyor, and a second gear directly driving the first gear.

18. The method according to claim 15, wherein the step of connecting a drive motor, includes selecting the first gear and second gear to have a gear ratio to one another that is substantially equal to an integer greater than 1.

19. The method according to claim 15, wherein the step of providing a conveyor includes providing a pair of opposing rollers as part of the conveyor, wherein the recording medium is fed between the rollers for moving the recording medium and scan unit relative to one another along the path of travel.

20. The method according to claim 19, wherein the step connecting a drive motor, includes coaxially attaching one of the gears to one of the rollers.

* * * * *